(12) United States Patent
Patel et al.

(10) Patent No.: US 8,871,690 B2
(45) Date of Patent: *Oct. 28, 2014

(54) FLUID LOSS ADDITIVE FOR OIL-BASED MUDS

(71) Applicant: M-I L.L.C., Houston, TX (US)

(72) Inventors: Arvind D. Patel, Sugar Land, TX (US); Sashikumar Mettath, Houston, TX (US); Emanuel Stamatakis, Houston, TX (US); Steve Young, Cypress, TX (US); Jim Friedheim, Spring, TX (US)

(73) Assignee: M-I L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,547

(22) Filed: Aug. 14, 2013

(65) Prior Publication Data

US 2013/0331302 A1 Dec. 12, 2013

Related U.S. Application Data

(63) Continuation of application No. 11/772,588, filed on Jul. 2, 2007, now Pat. No. 8,524,640.

(60) Provisional application No. 60/806,749, filed on Jul. 7, 2006.

(51) Int. Cl.
*C09K 8/035* (2006.01)
*C09K 8/36* (2006.01)
*C09K 8/502* (2006.01)

(52) U.S. Cl.
CPC .. *C09K 8/36* (2013.01); *C09K 8/502* (2013.01)
USPC ........... 507/206; 507/106; 507/129; 507/239; 166/305.1

(58) Field of Classification Search
None
See application file for complete search history.

(56) References Cited

U.S. PATENT DOCUMENTS

| | | | |
|---|---|---|---|
| 3,391,173 A | 7/1968 | Stratton | |
| 3,671,427 A | 6/1972 | Andrews, Jr. et al. | |
| 3,979,303 A | 9/1976 | Kang et al. | |
| 4,421,655 A | 12/1983 | Cowan | |
| 4,455,240 A | 6/1984 | Costello | |
| 4,501,672 A | 2/1985 | Connell et al. | |
| 4,569,799 A | 2/1986 | House | |
| 4,637,883 A | 1/1987 | Patel et al. | |
| 4,710,586 A | 12/1987 | Patel et al. | |
| 5,977,287 A * | 11/1999 | Mitchell et al. | 528/129 |
| 5,990,050 A | 11/1999 | Patel | |
| 6,399,545 B1 * | 6/2002 | Rose | 507/104 |
| 8,524,640 B2 * | 9/2013 | Patel et al. | 507/206 |
| 2005/0049147 A1 | 3/2005 | Patel et al. | |
| 2008/0171670 A1 | 7/2008 | Cowan et al. | |

FOREIGN PATENT DOCUMENTS

| | | |
|---|---|---|
| AU | 2007269081 B2 | 7/2011 |
| EP | 0178574 A2 | 4/1986 |
| WO | 2006031218 A1 | 3/2006 |

OTHER PUBLICATIONS

Fourth Office Action (w/translation) issued in corresponding Chinese Application No. 200780025633.6 dated Mar. 5, 2014 (7 pages).
Extended European Search Report issued in European Application No. 13166450.0 dated Oct. 1, 2013 (10 pages).
PCT International Search Report issued in International Application No. PCT/US2007/072941 dated Oct. 23, 2007 (3 pages).
PCT Written Opinion issued in International Application No. PCT/US2007/072941 dated Oct. 23, 2007 (4 pages).
Examination Report for related Australian Patent Application No. 2007269081; dated Feb. 12, 2010 (2 pages).
Office Action issued in Canadian Application No. 2,656,375 dated Jun. 4, 2010 (3 pages).
Extended European Search Report issued in European Application No. 07799351.7 dated Jun. 16, 2010 (7 pages).
Office Action issued in Mexican Application No. MX/a/2008/016454 dated Nov. 18, 2010 (8 pages).
Office Action issued in corresponding Eurasian Application No. 200970098 dated Dec. 24, 2010 (4 pages).
Office Action issued in corresponding Canadian Application No. 2,656,375 dated Feb. 25, 2011 (2 pages).
Office Action issued in corresponding Mexican Application No. MX/a/2008/016454 dated Apr. 27, 2011 (12 pages).
Office Action issued in corresponding European Application No. 07799351.7 dated May 3, 2011 (7 pages).
Office Action issued in corresponding Australian Application No. 2007269081 dated May 16, 2011 (2 pages).
Office Action issued in corresponding Chinese Application No. 200780025633.6 dated Sep. 5, 2011 (12 pages).
Office Action issued in corresponding Argentine Application No. P070103065 dated Sep. 11, 2011 (4 pages).
Office Action issued in corresponding Eurasian Application No. 200970098 dated Oct. 10, 2011 (4 pages).
Office Action issued in corresponding Mexican Application No. MX/a/2008/016454 dated Oct. 27, 2011 (10 pages).
Correspondence reporting Office Action dated Jun. 28, 2012 issued in corresponding Mexican Application No. MX/a/2008/016454 (11 pages).
Substantive Examination Report issued Sep. 25, 2012 in corresponding Malaysian application No. PI20085235 (2 pages).
Communication pursuant to Article 94(3) EPC issued Feb. 20, 2013 in corresponding European Patent application No. 07799351.7 (8 pages).
3rd Office Action (w/translation) issued in corresponding Chinese Application No. 200780025633.6 dated Mar. 28, 2013 (10 pages).

* cited by examiner

*Primary Examiner* — Alicia Bland
(74) *Attorney, Agent, or Firm* — Osha Liang LLP

(57) ABSTRACT

A composition that includes a product resulting from a condensation reaction of quebracho with at least one organophilic species that includes a reactive amine is disclosed.

11 Claims, No Drawings

FLUID LOSS ADDITIVE FOR OIL-BASED MUDS

CROSS-REFERENCE TO RELATED APPLICATIONS

This application is a continuation of application Ser. No. 11/772,588 filed on Jul. 2, 2007, which, pursuant to 35U.S.C.§119(e), claims priority to U.S. Patent Application No. 60/806,749, filed Jul. 7, 2006, which is herein incorporated by reference in its entirety.

BACKGROUND OF INVENTION

1. Field of the Invention

Embodiments disclosed herein relate generally to components of wellbore fluids (muds). More specifically, embodiments relate to fluid loss additives used in oil-based muds.

2. Background Art

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

Many types of fluids have been used in well bores particularly in connection with the drilling of oil and gas wells. The selection of an oil-based well bore fluid involves a careful balance of both the good and bad characteristics of such fluids in a particular application. The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil-based mud can be justified.

Drilling fluids are generally characterized as thixotropic fluid systems. That is, they exhibit low viscosity when sheared, such as when in circulation (as occurs during pumping or contact with the moving drilling bit). However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be removed or otherwise settle out from the liquid fraction.

There is an increasing need for drilling fluids having the rheological profiles that enable wells to be drilled more easily. Drilling fluids having tailored rheological properties ensure that cuttings are removed from the wellbore as efficiently and effectively as possible to avoid the formation of cuttings beds in the well which can cause the drill string to become stuck, among other issues. There is also the need from a drilling fluid hydraulics perspective (equivalent circulating density) to reduce the pressures required to circulate the fluid, reducing the exposure of the formation to excessive forces that can fracture the formation causing the fluid, and possibly the well, to be lost. In addition, an enhanced profile is necessary to prevent settlement or sag of the weighting agent in the fluid, if this occurs it can lead to an uneven density profile within the circulating fluid system which can result in well control (gas/fluid influx) and wellbore stability problems (caving/fractures).

To obtain the fluid characteristics required to meet these challenges the fluid must be easy to pump, so it requires the minimum amount of pressure to force it through restrictions in the circulating fluid system, such as bit nozzles or downhole tools. In other words the fluid must have the lowest possible viscosity under high shear conditions. Conversely, in zones of the well where the area for fluid flow is large and the velocity of the fluid is slow or where there are low shear conditions, the viscosity of the fluid needs to be as high as possible in order to suspend and transport the drilled cuttings. This also applies to the periods when the fluid is left static in the hole, where both cuttings and weighting materials need to be kept suspended to prevent settlement. However, it should also be noted that the viscosity of the fluid should not continue to increase under static conditions to unacceptable levels. Otherwise when the fluid needs to be circulated again this can lead to excessive pressures that can fracture the formation or lead to lost time if the force required to regain a fully circulating fluid system is beyond the limits of the pumps.

Further, it is also important that a drilling possess the ability to resist filtration. To prevent formation fluids from entering the wellbore hole, the hydrostatic pressure of the mud column must be greater than the pressure of the fluids in the pores of the formation. As a result, there is a tendency for the liquid portion of wellbore fluids to invade the permeable wellbore formations, which is referred to as the filtrate. As a result, the mud solids are filtered out onto the walls of the wellbore hole, forming a coating or cake. Thus, the muds must be formulated so as to keep the deposited cake permeability as low as possible in order to maintain a stable borehole and minimize filtrate invasion of, and damage to, potentially productive strata and horizons in the production formation. The loss of filtrate to the formation is referred to as fluid loss.

In addressing issues surrounding fluid loss control, one must choose additives that are compatible with the solvent system of the mud. Oil-based muds frequently use invert emulsions with a mixture of oil and water in the presence of surfactants. Fluid loss control materials typically used in drilling muds include plant tannins, such as those found in the wood of quebracho, chestnut, oak and urunday, and in the bark of wattle, mangrove, oak, eucalyptus, hemlock, pine, larch, and willow trees. Other materials include starches (e.g. corn, potato), starch derivatives, water soluble cellulose derivatives, humates, polyphosphates or phosphate-containing materials, lignite materials, lignosulfonates and synthetic polymers (especially swellable polymers and gels).

Many of these polymers and condensed-tannin materials are either water soluble or at least hydrophilic and thus benefit from chemical modification to impart organophilic character when used in conjunction with oil/invert emulsion-based muds. For example, U.S. Pat. No. 4,421,655 discloses the use of humates modified with amido amines in the presence of polyvalent metal ion. U.S. Pat. No. 4,710,586 discloses the use of alkyl quaternary ammonium salts reacted with quebracho for use as fluid loss additives. Another consideration is the use of materials that are environmentally compatible The materials that affect the rheological profile of oil-based muds may include both viscosifiers and fluid loss additives. Accordingly, there exists a continuing need for improving these drilling materials and wellbore fluid formulations.

SUMMARY OF INVENTION

In one aspect, embodiments disclosed herein relate to a composition that includes a product resulting from a condensation reaction of quebracho with at least one organophilic species that includes a reactive amine.

In another aspect, embodiments disclosed herein relate to an invert emulsion drilling fluid that includes an oleaginous continuous phase, a non-oleaginous discontinuous phase, an emulsifier present in an amount sufficient to stabilize the invert emulsion and a quebracho-based additive resulting from a condensation reaction of quebracho and at least one organophilic species that includes a reactive amine.

In yet another aspect, embodiments disclosed herein relate to a method of drilling a subterranean hole with an invert emulsion drilling fluid, which includes mixing an oleaginous fluid, a non-oleaginous fluid, an emulsifier, and a quebracho-based additive resulting from a condensation reaction of quebracho and an organophilic species that includes a reactive amine, to form an invert emulsion and drilling the subterranean hole using this invert emulsion as the drilling fluid.

Other aspects and advantages of the invention will be apparent from the following description and the appended claims.

DETAILED DESCRIPTION

Embodiments disclosed herein relate to fluid loss additives in wellbore fluid mud formulations. In particular, some embodiments disclosed herein relate to fluid loss additives which are condensation reaction products of quebracho and lipophilic amines. In the following description, numerous details are set forth to provide an understanding of the present invention. However, it will be understood by those skilled in the art that the present invention may be practiced without these details and that numerous variations or modifications from the described embodiments may be possible.

Fluid Loss Additive

In one embodiment, a composition for a fluid loss additive comprises a condensation reaction product of quebracho and an organophilic species having a reactive amine. As used herein, a "reactive amine" comprises any amine having at least one active hydrogen, i.e., primary or secondary amines, which are able to react with quebracho in a condensation reaction.

In one embodiment the organophilic reactive amine may comprise $C_6$-$C_{22}$ fatty acid amines. Such amines may be derived by standard procedures from fatty acids including, for example, lauric acid, myristic acid, palmitic acid, stearic acid, oleic acid, or linoleic acid. Other natural long chain amines such as tallow amine may be reacted with quebracho. In one embodiment, the organophilic reactive amine may include any $C_6$-$C_{22}$ alkyl amine or polyamine. In yet another embodiment, the organophilic reactive amine may include a $C_6$-$C_{22}$ alkyl amine, wherein the amine has the formula $H_2NR$, where R is an alkyl chain having 6 to 22 carbons. The carbon chain(s) may be branched or straight chain alkyls, which may be substituted alkyls. One of ordinary skill in the art would recognize that by substituted one means replacing a hydrogen along the alkyl chain with any other atom or group of atoms, including isotopes such as deuterium.

In another embodiment, the organophilic reactive amine may comprise at least one of a polyamine surfactant and an amidoamine surfactant. Amidoamine surfactants suitable that may be reacted with quebracho include those represented by:

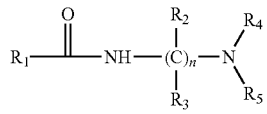

wherein $R_1$ is selected from a $C_{12}$-$C_{30}$ alkyl, $C_{12}$-$C_{30}$ alkenyl, $C_{12}$-$C_{30}$ arylalkyl, and $C_{12}$-$C_{30}$ cycloalkyl; $R_2$ and $R_3$ are each independently selected from H or a $C_1$-$C_4$ alkyl; $R_4$ and $R_5$ are each independently selected from H, $C_1$-$C_4$ alkyl, $C_1$-$C_4$ alkoxyalkyl, and $C_1$-$C_4$ hydroxyalkyl; and n is an integer from 1 to 10. Amidoamines may be formed from the reaction of a polyamine with a carboxylic acid. For example, in a particular embodiment, an amidoamine formed from a $C_6$-$C_{22}$ fatty acid reacted with a polyamine. In a particular embodiment, the organophilic reactive amine may include a $C_{12}$-$C_{22}$ fatty acid reacted with a polyalkylene polyamine. Alternatively, the organophilic reactive amine may include 2-alkyl imidazoline formed from $C_{12}$-$C_{22}$ fatty acid reacted with a polyalkylene polyamine, which may then be derivatized with a dicarboxylic acid. Such 2-alkyl imidazoline derivatives are described for example in U.S. Pat. No. 4,544,756, which is herein incorporated by reference in its entirety.

In a particular embodiment, SUREMUL®, an amidoamine surfactant that is commercially available from M-I L.L.C. (Houston, Tex.), may be reacted with quebracho to form a quebracho-amine reaction product as disclosed herein. Polyamines suitable to be reacted with quebracho include linear or branched organophilic $C_6$-$C_{36}$ fatty polyamines including polyaliphatic polyamines, heterocyclic polyamines, and alkylalkanol polyamines. In one embodiment, organophilic reactive polyamines may have at least one amine being a reactive amine. Alternatively, an organophilic species comprising a tertiary amine may be reacted with quebracho.

Formation of the Fluid Loss Additives

To form the reaction products of quebracho and an organophilic reactive amine disclosed herein, the organophilic reactive amine may be slowly mixed with the desired amount of finely divided quebracho, and mixed for about 15 minutes in a Warring blender or ground in a mortar and pestle. The mixture may be heated to initiate a condensation reaction between quebracho and the organophilic reactive amine. The condensation reaction products may be dried and ground again to a fine powder. On a commercial scale, any conventional high intensity mixer may be used, such as a pug mill, Littleford mixer, and the like. After drying and grinding, the quebracho-amine condensation reaction product may be readily dispersed in the oil base drilling mud formulation by mixing or stirring; or the quebracho-amine reaction product may be added at any stage of the formulations of the oil base mud compositions.

In one embodiment, the condensation reaction of quebracho with the organophilic reactive amine may require the application of external heating. In a particular embodiment, the reaction may occur in a temperature range from about 100 to 350° F., and from about 175 to about 275° F. in another embodiment.

In another embodiment, the weight percent ratio of quebracho to the organophilic reactive amine may range from about 50:50 to about 95:5, from about 66:34 to about 90:10 in another embodiment, and from about 75:25 to 80:15 in yet another embodiment.

In yet another embodiment, the quebracho-amine reaction product may be finely ground to a particle size in a range from 10 mesh to 400 mesh US Standard, such that at least 50 weight percent passes a 20 mesh screen. In another embodiment, the quebracho-amine reaction product may be finely ground to a particle size in a range from 10 to 50 mesh, and in a range from about 15 to 25 mesh in yet another embodiment.

Invert Emulsion Fluids and Method of Drilling

In one embodiment, the quebracho-amine reaction products disclosed herein may be included in a wellbore fluid. The wellbore fluids may include, for example, an oleaginous continuous phase, a non-oleaginous discontinuous phase, a quebracho-amine reaction product, weighting agents, emulsifiers, and/or viscosifiers.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof. In a particular embodiment, various weighting agents may be included in a wellbore fluid.

Conventional methods can be used to prepare the drilling fluids disclosed herein in a manner analogous to those normally used, to prepare conventional oil-based drilling fluids. In one embodiment, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

The amounts of the quebracho-amine reaction product used in the drilling fluid formulations may vary from about 1 pound per barrel of oil base drilling muds to about 20 pounds per barrel in one embodiment; from 3 to 16 pounds per barrel in another embodiment; and from 6 to 12 pounds per barrel in yet another embodiment. One of ordinary skill in the art would recognize that more than about 16 pounds per barrel increases costs and may not be necessary, although more can be used as needed.

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Emulsifiers that may be used in the fluids disclosed herein include, for example, fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Additionally, lime or other alkaline materials are typically added to conventional invert emulsion drilling fluids and muds to maintain a reserve alkalinity.

Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. FAZE-WET™, VERSACOAT™, SUREWET™, VERSAWET™, and VERSAWET™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Organophilic clays, normally amine treated clays, may be useful as viscosifiers and/or emulsion stabilizers in the fluid composition disclosed herein. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications. VG-69™ and VG-PLUS™ are organoclay materials distributed by M-I, L.L.C., Houston, Tex., and VERSA-HRP™ is a polyamide resin material manufactured and distributed by M-I, L.L.C., that may be used in the fluids disclosed herein. In some embodiments, the viscosity of the displacement fluids is sufficiently high such that the displacement fluid may act as its own displacement pill in a well.

Conventional suspending agents that may be used in the fluids disclosed herein include organophilic clays, amine treated clays, oil soluble polymers, polyamide resins, polycarboxylic acids, and soaps. The amount of conventional suspending agent used in the composition, if any, may vary depending upon the end use of the composition. However, normally about 0.1% to about 6% by weight is sufficient for most applications. VG-69™ and VG-PLUS™ are organoclay materials distributed by M-I L.L.C., and VERSA-HRP™ is a polyamide resin material manufactured and distributed by M-I L.L.C., that may be used in the fluids disclosed herein.

Weighting agents or density materials suitable for use the fluids disclosed herein include galena, hematite, magnetite, iron oxides, illmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

In one embodiment, a method of drilling a subterranean hole with an invert emulsion drilling fluid comprises mixing an oleaginous fluid, a non-oleaginous fluid, an emulsifier, and a quebracho-amine condensation reaction product to form an invert emulsion; and drilling the subterranean hole using this invert emulsion as the drilling fluid. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling. One skilled in the art would recognize that oil-based drilling muds may be prepared with a large variety of formulations. Specific formulations may depend on the state of drilling a well at a particular time, for example, depending on the depth and/or the composition of the formation. The drilling mud compositions described above may be adapted to provide improved oil-based drilling muds under conditions of high temperature and pressure, such as those encountered in deep wells.

The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

EXAMPLES

The following examples were used to test the effectiveness of quebracho-amine reaction products disclosed herein as fluid loss additives.

Tested fluid loss agents were formed as follows: 1) Additive A: 55 g of Quebracho was thoroughly mixed with 15 g of fatty acid derived amine using mortar and pestle and the mixture was subjected to 225° F. for 16-20 h. The product so obtained was finely powdered using a mixer and screened using #20 meshes and used as fluid loss control agent; 2) Additive B: 55 g of TANNATHIN® was thoroughly mixed with 15 g of fatty acid derived amine using mortar and pestle and the mixture was subjected to 225° F. for 16-20 h. The product so obtained was finely powdered using a mixer and screened using #20 meshes and used as fluid loss control agent; and 3) Additive C: 300 g of powdered Quebracho was thoroughly mixed with SUREMUL® (75 g) using mortar and pestle and the mixture was subjected to 225° F. for 16-20 h. The product so obtained was finely powdered using a mixer and screened using #20 meshes and used as fluid loss control agent.

The fluid loss additives (Additives A, B, and C) were included in invert emulsion fluids formulated with IO 1618 as the base oil (synthetic oil composed of $C_{16}$-$C_{18}$ internal olefins) and water in an approximate ratio of 65:35 and various additives. Referring to Tables 1a and 1b below, the components included in invert emulsion fluid Samples 1-13 are shown.

TABLE 1a

| | Mud Compositions (quantities in pounds per barrel) | | | | | | |
|---|---|---|---|---|---|---|---|
| Sample # | 1 | 2 | 3 | 4 | 5 | 6 | 7 |
| Components | bbl | bbl | bbl | bbl | bbl | bbl | bbl |
| IO 1618 | 143.81 | 143.81 | 143.81 | 143.81 | 143.11 | 143.81 | 143.81 |
| $CaCl_2$ | 27.73 | 27.73 | 27.73 | 27.73 | 21.46 | 27.73 | 27.73 |
| Water | 77.63 | 77.63 | 77.63 | 77.63 | 60.08 | 77.63 | 77.63 |
| Lime | 4.00 | 4.00 | 4.00 | 4.00 | 4.00 | 4.00 | 4.00 |
| Organo Clay | 4.00 | 4.00 | 4.00 | 4.00 | 4.00 VG Plus ® | 4.00 | 4.00 |
| SUREMUL ® | 10.00 | 10.00 | 10.00 | 10.00 | 12.00 | 12.00 | 12.00 |
| SUREWET ® | 4.00 | 4.00 | 4.00 | 4.00 | 4.00 | 4.00 | 4.00 |
| Fluid Loss Control | 10.00 - Additive A | 12.00 - Additive A | 10.00 - Additive B | 12.00 - Additive B | 10.00 - Additive A | 10.00 - Additive A | 10.00 - Additive C |
| RHETHIK ® | — | — | — | — | 0.50 | 0.00 | 0.50 |
| Rev. Dust | 20.00 | 20.00 | 20.00 | 20.00 | 20.00 | 20.00 | 20.00 |
| Barite | 209.83 | 209.83 | 209.83 | 209.83 | 209.83 | 209.83 | 209.83 |
| Aging Temp. | 300° F. | 300° F. | 300° F. | 300° F. | 350° F. | 350° F. | 350° F. |

TABLE 1b

Mud Composition (quantities in pound per barrel)

| Sample # | 8 | 9 | 10 | 11 | 12 | 13 |
|---|---|---|---|---|---|---|
| Components | bbl | bbl | bbl | bbl | bbl | bbl |
| IO 1618 | 143.81 | 143.11 | 143.11 | 147.94 | 147.94 | 147.94 |
| $CaCl_2$ | 27.73 | 21.46 | 21.46 | 16.64 | 16.64 | 16.64 |
| Water | 77.63 | 60.08 | 60.08 | 46.59 | 46.59 | 46.59 |
| Lime | 4.00 | 4.00 | 4.00 | 4.00 | 4.00 | 4.00 |
| VG PLUS ® | 8.00 | 6.00 | 6.00 | 8.00 | 8.00 | 8.00 |
| SUREMUL ® | 12.00 | 12.0 | 12.0 | 12.0 | 12.00 | 12.00 |
| SUREWET ® | 4.0 | 4.0 | 4.00 | 4.00 | 4.00 | 4.00 |
| Fluid Loss Control | 12.0 Quebracho | 18.0 Additive C | 20.0 Additive C | 20.0 Additive C | 18.00 Additive C | 20.00 Additive C |
| RHETHIK ® | 0.50 | — | — | — | — | — |
| Rev. Dust | 20.00 | 15.00 | 15.00 | 15.00 | 15.00 | 15.00 |
| Barite | 209.83 | 329.35 | 329.35 | 335.84 | 335.84 | 335.84 |
| Aging Temp. | 350° F. | 350° F. | 350° F. | 350° F. | 375° F. | 375° F. |

The above invert emulsion drilling fluids were heat aged at the temperatures shown below in Tables 2a and 2b by hot rolling for 16 hours, and the rheological properties of the various mud formulations were determined using a Farm Model 35 Viscometer, available from Fann Instrument Company. The fluid exhibited the following properties, as shown below in Table 2.

TABLE 2

Fluid Rheology at 120° F.

| Sample | 1 | 2 | 3 | 4 | 5 | 6 | 7 | 8 | 9 | 10 | 11 | 12 | 13 |
|---|---|---|---|---|---|---|---|---|---|---|---|---|---|
| 600 RPM | 67 | 72 | 85 | 87 | 72 | 74 | 79 | 70 | 92 | 89 | 103 | 114 | 140 |
| 300 RPM | 39 | 39 | 52 | 53 | 41 | 41 | 48 | 41 | 50 | 48 | 58 | 63 | 75 |
| 200 RPM | 29 | 29 | 40 | 41 | 31 | 29 | 38 | 32 | 36 | 35 | 42 | 46 | 53 |
| 100 RPM | 18 | 18 | 27 | 28 | 19 | 18 | 26 | 21 | 21 | 21 | 26 | 26 | 31 |
| 6 RPM | 5 | 5 | 10 | 10 | 6 | 5 | 9 | 7 | 5 | 5 | 7 | 5 | 6 |
| 3 RPM | 5 | 4 | 9 | 9 | 5 | 4 | 8 | 6 | 3 | 4 | 5 | 3 | 4 |
| 10 s gel | 6 | 6 | 12 | 13 | 5 | 4 | 8 | 7 | 5 | 5 | 8 | 6 | 6 |
| 10 m gel | 6 | 6 | 16 | 18 | 7 | 6 | 11 | 9 | 7 | 7 | 15 | 11 | 12 |
| PV (cP) | 28 | 33 | 33 | 34 | 31 | 33 | 31 | 29 | 42 | 41 | 45 | 51 | 65 |
| YP (lb/100 $ft^2$) | 11 | 6 | 19 | 19 | 10 | 8 | 17 | 11 | 8 | 7 | 14 | 12 | 10 |
| HTHP Fluid loss (mL) | 2.4 | 3.2 | 20.8 | 17.6 | 3.2 | 3.0 | 3.0 | 29.0 | 7.2 | 6.0 | 2.8 | 8.4 | 11.2 |

The results of the HTHP fluid loss measurements show that quebracho reacted with fatty acid amines (Samples 1, 2, 5, and 6) or with the amidoamine surfactant, SUREMUL®, (Samples 7, 9-13) are superior relative to unmodified quebracho (Sample 8) or TANNATHIN®, a lignite, reacted with fatty acid amines (Samples 3 and 4).

Advantages of the additives and fluids described herein may include at least one of the following. Fluids incorporating a reaction product of an organophilic reactive amine and quebracho may allow for enhanced rheological properties of the fluids. Such agents may also increase lubricity and diminish wear of the drilling equipment. Furthermore, the quebracho-amine reaction products described herein may be considered environmentally compatible due to their ready biodegradability. Compositions as described herein may be effectively used as fluid loss agents at temperatures as high as 375 to 450° F. As compared to other products, the fluid loss agents disclosed herein may provide ease of dispersion into the oil base fluids. Additionally, the formulation of the fluid loss additives disclosed herein may not require the presence of polyvalent cations and may be substantially free of polyvalent metallic cations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. An invert emulsion wellbore fluid, comprising:
   an oleaginous continuous phase;
   a non-oleaginous discontinuous phase;
   an emulsifier present in an amount sufficient to stabilize the invert emulsion; and
   a quebracho-based additive resulting from a reaction of quebracho and a $C_6$-$C_{22}$ alkyl amine,
   wherein the amine has the formula $H_2NR$, where R is an alkyl chain having 6 to 22 carbons.

2. The wellbore fluid of claim 1, wherein the $C_6$-$C_{22}$ alkyl amine comprises at least one surfactant.

3. The wellbore fluid of claim 1, wherein the weight percent ratio of quebracho to the a $C_6$-$C_{22}$ alkyl amine ranges from 50:50 to about 95:5.

4. The wellbore fluid of claim 1, wherein the oleaginous fluid comprises from about 30% to less than 100% by volume of the drilling fluid.

5. The wellbore fluid of claim 1, wherein the oleaginous fluid is selected from diesel oil, mineral oil, synthetic oil, ester oils, glycerides of fatty acids, aliphatic esters, aliphatic ethers, aliphatic acetals, or other such hydrocarbons and combinations thereof.

6. The wellbore fluid of claim 1, wherein the non-oleaginous fluid comprises from about 1% to about 70% by volume of said drilling fluid.

7. The wellbore fluid of claim 1, wherein the non-oleaginous fluid is selected from fresh water, sea water, brine, aqueous solutions containing water soluble organic salts, water soluble alcohols or water soluble glycols or combinations thereof.

8. The wellbore fluid of claim 1, further comprising:
   a weighting agent.

9. A method of drilling a subterranean hole with an invert emulsion drilling fluid, comprising:
   drilling the subterranean hole using an invert emulsion as the drilling fluid, the invert emulsion comprising: an oleaginous fluid, a non-oleaginous fluid, an emulsifier, and a quebracho-based additive resulting from a reaction of quebracho and a $C_6$-$C_{22}$ alkyl amine, wherein the amine has the formula $H_2NR$, where R is an alkyl chain having 6 to 22 carbons.

10. The method of claim 9, wherein the quebracho-based additive has a particle size ranging from 10 to 50 mesh.

11. The method of claim 9, wherein the quebracho-based additive has a particle size ranging from 15 to 25 mesh.

* * * * *